United States Patent
Kim et al.

(10) Patent No.: US 9,104,999 B2
(45) Date of Patent: Aug. 11, 2015

(54) OUTAGE SCHEDULE MANAGEMENT APPARATUS AND METHOD IN EMS

(71) Applicant: LSIS CO., LTD., Anyang-si, Gyeonggi-do (KR)

(72) Inventors: Young In Kim, Seoul (KR); Yoon Sung Cho, Pyeongtaek-si (KR)

(73) Assignee: LSIS CO., Ltd., Anyang-Si, Gyeonggi-Do (KR)

( * ) Notice: Subject to any disclaimer, the term of this patent is extended or adjusted under 35 U.S.C. 154(b) by 360 days.

(21) Appl. No.: 13/669,991

(22) Filed: Nov. 6, 2012

(65) Prior Publication Data

US 2013/0116843 A1    May 9, 2013

(30) Foreign Application Priority Data

Nov. 7, 2011 (KR) .................. 10-2011-0114980

(51) Int. Cl.
  *G06F 19/00* (2011.01)
  *G05F 5/00* (2006.01)
  *G06Q 10/06* (2012.01)
  *G06Q 50/06* (2012.01)

(52) U.S. Cl.
  CPC .......... *G06Q 10/06375* (2013.01); *G06Q 50/06* (2013.01)

(58) Field of Classification Search
  CPC .............. G06Q 50/06; G06Q 10/06375; H02J 13/0001
  USPC .......................................... 700/291, 292, 286
  See application file for complete search history.

(56) References Cited

U.S. PATENT DOCUMENTS

| | | | |
|---|---|---|---|
| 7,016,934 B2* | 3/2006 | Kawamura et al. | 709/202 |
| 7,343,360 B1* | 3/2008 | Ristanovic et al. | 705/412 |
| 8,041,467 B2* | 10/2011 | Black et al. | 700/291 |
| 8,462,014 B1* | 6/2013 | Kardos et al. | 340/870.02 |
| 2004/0236620 A1* | 11/2004 | Chauhan et al. | 705/9 |

FOREIGN PATENT DOCUMENTS

| | | |
|---|---|---|
| CN | 101673965 | 3/2010 |
| CN | 101996271 | 3/2011 |
| CN | 102081765 | 6/2011 |
| JP | 02051326 | 2/1990 |
| JP | 2004135394 | 4/2004 |
| JP | 2005-080471 | 3/2005 |
| JP | 2007189822 | 7/2007 |
| JP | 2008086152 | 4/2008 |
| JP | 2011182557 | 9/2011 |
| KR | 10-0964298 | 6/2010 |

OTHER PUBLICATIONS

Shin, et al., "Design of management and study program for effective outage scheduling," KIEE summer autumn conference, Nov. 2008, 3 pages.

(Continued)

*Primary Examiner* — Michael D Masinick
(74) *Attorney, Agent, or Firm* — Lee, Hong, Degerman, Kang & Waimey

(57) ABSTRACT

An outage schedule management apparatus and a method are provided, wherein a topology change is executed in response to an outage schedule set up by a user input, and a validity determination is executed to system operation standard to approve an outage.

18 Claims, 3 Drawing Sheets

(56) References Cited

OTHER PUBLICATIONS

Korean Intellectual Property Office Application Serial No. 10-2011-0114980, Office Action dated Oct. 26, 2012, 5 pages.
Japan Patent Office Application Serial No. 2012-243417, Office Action dated Jan. 21, 2014, 7 pages.
Japan Patent Office Application Serial No. 2012-243417, Office Action dated Sep. 30, 2014, 7 pages.
Honghai, et al., "Design of the Outage Management System for Distribution Network," Automation of Electric Power systems, vol. 28, No. 24, Dec. 2004, pp. 71-74.
The State Intellectual Property Office of the People's Republic of China Application U.S. Appl. No. 201210441656.8, Office Action dated Jun. 3, 2015, 8 pages.

* cited by examiner

OUTAGE SCHEDULE MANAGEMENT APPARATUS AND METHOD IN EMS

CROSS-REFERENCE TO RELATED APPLICATIONS

Pursuant to 35 U.S.C. §119 (a), this application claims the benefit of earlier filing date and right of priority to Korean Patent Application No. 10-2011-0114980, filed on Nov. 7, 2011, the contents of which are hereby incorporated by reference in their entirety.

BACKGROUND OF THE DISCLOSURE

1. Field of the Disclosure

The present disclosure relates to an outage management, and more particularly to an outage schedule management apparatus and method configured for use in EMS (Energy Management System).

2. Discussion of the Related Art

The information disclosed in this Discussion of the Related Art section is only for enhancement of understanding of the general background of the present disclosure and should not be taken as an acknowledgement or any form of suggestion that this information forms the prior art already known to a person skilled in the art.

In general, an EMS (Energy Management System) is an uppermost system of a power grid to manage supply/demand of entire power and operation of the system.

An outage schedule system of the EMS manages a schedule and operation of idle facilities. It should be noted that all facilities forming a power system are always under an operable state. That is, facilities may be stopped in operation for routine maintenance/repair or for the purpose of prior preventive maintenance by finding abnormal symptoms such as overheating and the like, or newly installing adjacent facilities or changing system configuration, the operation of which is called an outage or outage event, where set-up of system operation program is called an outage schedule or outage scheduling according to outage conditions.

The outage schedule is manually inputted by handwriting by a field worker at each area, reviewed by using programs including power flow calculation and fault calculation, and determined by the analysis for approval. However, the input by handwriting of outage schedule information ranging from hundreds to thousands of outage events a year is problematic in terms of waste of human resources, and process time as it takes lots of time.

FIG. 1 is an exemplary view illustrating an outage schedule management method according to prior art, where yearly, monthly and daily outage schedule information are inputted by hand or by handwriting to a field worker of each area, and outage approval is determined by forming an outage information-applied system through power flow calculation, fault calculation and credible accident interpretation.

Referring to FIG. 1, the conventional outage management includes a scheduled outage (100) and an emergency outage (200), where the scheduled outage (100) further includes an approval operation (110) and a notification operation (120).

A yearly outage review (111) is to prepare a utility (or facilities) outage schedule to be processed in a year in a predetermined format and to disclose (115) at every November end. A monthly outage review (112) is to prepare utility outage schedule to be processed in next month in a predetermined format and to disclose (115) at every $20^{th}$ day. A temporary outage (113) is to prepare a utility outage schedule to be processed temporarily in a predetermined format and to disclose (115) along with a next day outage review (114). The next day outage review (114) is to prepare facilities outage schedule to be processed in next day in a predetermined format and to disclose (115) at 18:00 hours every day.

A next day outage list (122) in the notification operation (120) is a list transmitted from regional control centers to electricity feed stations. The list thus received is inputted by a field worker by hand (126, 123).

The field worker reviews (131) influences applied to system through power flow calculation, fault calculation and credible accident interpretation, determines (132) whether the outage is appropriate for system operation standard via a conference, and determines (133, 134) whether to trigger the outage as a result of the conference.

Meanwhile, if an emergency outage occurs (201), relevant regional electricity feed station requests a power exchange of an outage approval (202). The field worker inputs the received outage schedule by hand (203), reviews (204) influences applied to system through power flow calculation, fault calculation and credible accident interpretation, determines (205) whether the outage is appropriate for system operation standard via a conference, and determines (206, 207) whether to trigger the outage as a result of the conference.

In scheduling stage of power system in the conventional EMS system, a region where an outage is triggered is largely formed with a weaker system condition over that of an original system operation plan, due to non-consideration of separate outage condition for facilities. Furthermore, all outage scheduling are inputted by the field workers by hand, a system is newly constructed through an existing programs based on the handwritten outage scheduling, and whether to approve the outage is determined through a conference based on experiences by the field workers through the power flow calculation, fault calculation and credible accident interpretation.

However, the conventional outage management system thus described is problematic in that outage schedule information is manually processed to require many human resources, whereby process time is lengthened to make it difficult to establish reliability and credibility.

Another problem is that outage schedule is processed in written form to allow information on next day outage to be shared at 18:00 hours every day, information on monthly outage to be shared at every $20^{th}$ day of a month, and information on yearly outage to be shared in November, such that it is difficult to share the information on outage and to determine validity of whether to reflect the outage schedules.

SUMMARY OF THE DISCLOSURE

This section provides a general summary of the disclosure, and is not a comprehensive disclosure of its full scope or all of its features.

Exemplary aspects of the present disclosure are to substantially solve at least the above problems and/or disadvantages and to provide at least the advantages below. Accordingly, an aspect of the present disclosure provides an outage schedule management apparatus and a method in EMS configured for an operator to propose, as a review data, a solution based on power flow calculation, fault calculation and credible accident interpretation during outage review before approval of outage schedule, whereby a system subsequent to outage can be predicted.

Another aspect of the present disclosure provides an outage schedule management apparatus and a method in EMS configured to input an outage schedule online, providing an operator with convenience, and to directly input the outage schedule into a system, allowing an automatic set-up of outage-applied system through topology process once the outage schedule is set up, whereby a fast and reliable determination required for outage event can be implemented.

Still another aspect of the present disclosure provides an outage schedule management apparatus and a method in EMS configured to automatically process a topology once an outage schedule is set up, and to real time determine whether the outage schedule is appropriate by thereafter implementing power flow calculation, fault calculation and credible accident interpretation, whereby a fast and reliable determination on the outage can be realized.

It should be emphasized, however, that the present disclosure is not limited to a particular disclosure, as explained above. It should be understood that other technical subjects not mentioned herein may be appreciated by those skilled in the art.

In one general aspect of the present disclosure, there may be provided an outage schedule management apparatus, the apparatus comprising: a controller executing a topology change in response to an outage schedule set up by a user input, determining validity of system operation standard and approving the outage schedule; and a first storage storing the outage schedule in response to control of the controller.

In some exemplary embodiments, the apparatus may further comprise a display unit displaying the outage schedule in response to the control of the controller and approval/disapproval of the outage schedule.

In some exemplary embodiments, the apparatus may further comprise a transmitter transmitting the outage schedule via network, in a case the controller approves the outage schedule.

In some exemplary embodiments, the controller may apply the outage schedule to a system to execute the topology change.

In some exemplary embodiments, the controller may reconfigure the system by excluding an outaged portion from the system to execute the topology change.

In some exemplary embodiments, the controller may execute power flow calculation, fault calculation and credible accident interpretation to determine the validity of system operation standard.

In some exemplary embodiments, the controller may execute the power flow calculation to provide a user with information that an issue may occur on the system if the outage schedule is applied.

In some exemplary embodiments, the controller may execute the fault calculation to determine an issue that may occur by the outage schedule and to provide a user with the determination.

In some exemplary embodiments, the controller may execute the credible accident interpretation to provide a user with influence affected by the outage schedule to system.

In some exemplary embodiments, the apparatus may further comprise a user input unit inputting the outage schedule by a user.

In some exemplary embodiments, the controller may designate a line blocker and a line switch of a relevant region to set up the outage schedule, in a case a user sets up facilities for outage through the user input unit.

In some exemplary embodiments, the apparatus may further comprise a second storage storing information related to the facilities and the line blocker and the line switch.

In another aspect of the present disclosure, there may be provided an outage schedule management method, the method comprising: executing topology change in response to outage schedule set up by input of a user; executing validity determination of system operation standard; and approving outage.

In some exemplary embodiments, the method may further comprise setting up the outage schedule by designating a line blocker and a line switch of a relevant region, in a case a user sets up facilities for outage.

In some exemplary embodiments, the topology change may be applying the outage schedule to system.

The outage schedule management apparatus and method in EMS according to exemplary embodiments of the present disclosure have an advantageous effect in that an operator proposes, as a review data, a solution based on power flow calculation, fault calculation and credible accident interpretation during outage review before approval of outage schedule, whereby a system subsequent to outage can be predicted, and a stable operation based on system change can be proposed.

Another advantageous effect is that an automatic topology is processed once outage schedule is set up, and whether the outage schedule is appropriate is determined real time by executing power flow calculation, fault calculation and credible accident interpretation, whereby a fast and reliable determination on the outage can be realized.

Other exemplary aspects, advantages, and salient features of the disclosure will become more apparent to persons of ordinary skill in the art from the following detailed description, which, taken in conjunction with the annexed drawings, discloses exemplary embodiments of the invention.

The above and other features of the present disclosure are discussed infra.

BRIEF DESCRIPTION OF THE DRAWINGS

The above and other features of the present invention will now be described in detail with reference to certain exemplary embodiments thereof illustrated in the accompanying drawings which are given hereinafter by way of illustration only, and thus are not limitative of the present invention, and wherein.

Figure 1:
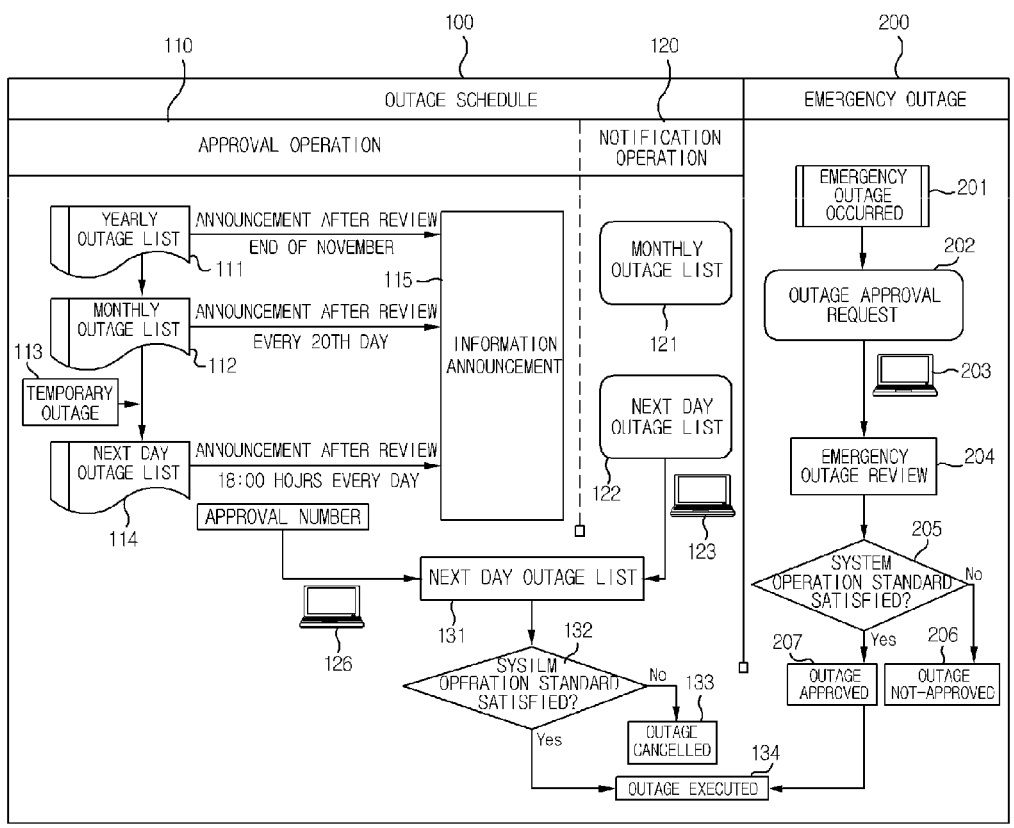
FIG. 1 is an exemplary view illustrating an outage schedule management method according to prior art.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

It is to be understood that both the foregoing general description and the following detailed description of the present disclosure are exemplary and explanatory and are intended to provide further explanation of the disclosure as claimed.

DETAILED DESCRIPTION

Hereinafter, exemplary embodiments of the present disclosure will be described in detail with reference to the accompanying drawings.

In describing the present disclosure, detailed descriptions of constructions or processes known in the art may be omitted to avoid obscuring appreciation of the invention by a person of ordinary skill in the art with unnecessary detail regarding such known constructions and functions. Accordingly, the meaning of specific terms or words used in the specification and claims should not be limited to the literal or commonly employed sense, but should be construed or may be different in accordance with the intention of a user or an operator and customary usages. Therefore, the definition of the specific terms or words should be based on the contents across the specification.

The suffixes 'module', 'unit' and 'part' may be used for elements in order to facilitate the disclosure. Significant meanings or roles may not be given to the suffixes themselves and it is understood that the 'module', 'unit' and 'part' may be used together or interchangeably. That is, the terms "-er", "-or", "part" and "module" described in the specification mean units for processing at least one function and operation and can be implemented by hardware components or software components, and combinations thereof.

As used herein, "exemplary" is merely meant to mean an example, rather than the best. It is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated. That is, in the drawings, the size and relative sizes of layers, regions and/or other elements may be exaggerated or reduced for clarity. Like numbers refer to like elements throughout and explanations that duplicate one another will be omitted.

It will be understood that, although the terms first, second, etc. may be used herein to describe various elements, these elements should not be limited by these terms. These terms are only used to distinguish one element from another. For example, a first region/layer could be termed a second region/layer, and, similarly, a second region/layer could be termed a first region/layer without departing from the teachings of the disclosure.

The terminology used herein is for the purpose of describing particular embodiments only and is not intended to be limiting of the general inventive concept. As used herein, the singular forms "a", "an" and "the" are intended to include the plural forms as well, unless the context clearly indicates otherwise.

Figure 2:
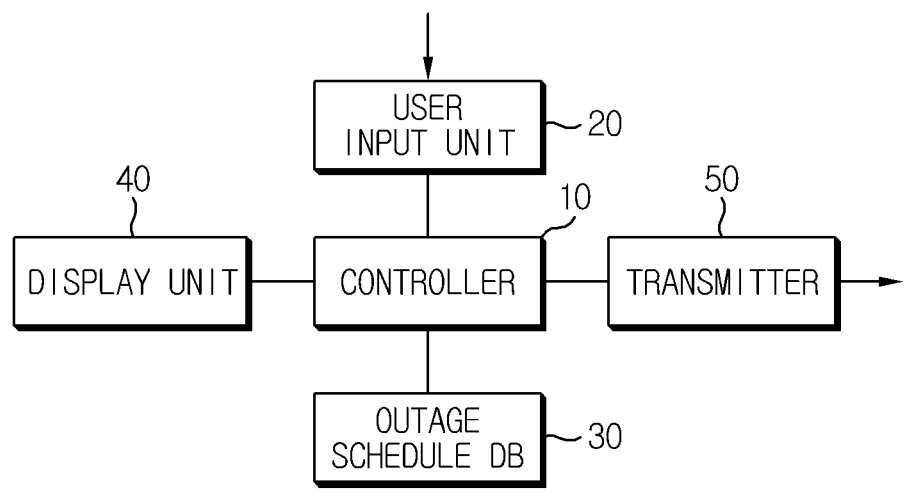
FIG. 2 is a schematic block diagram illustrating an outage schedule management apparatus in EMS according to an exemplary embodiment of the present disclosure.

FIG. 2 is a schematic block diagram illustrating an outage schedule management apparatus in EMS according to an exemplary embodiment of the present disclosure.

Referring to FIG. 2, the outage schedule management apparatus in EMS according to an exemplary embodiment of the present disclosure comprises a controller (10), a user input unit (20), an outage schedule database (DB, 30), a display unit (40) and a transmitter (50).

A user inputs a new outage schedule through the user input unit (20) at a regional electricity feeder station, and the controller (10) controls in such a manner that the outage schedule DB (30) stores the outage schedule inputted through the user input unit (20). The controller (10), based on database stored in the outage schedule DB (30), controls the display unit (40) to allow displaying an outage schedule up to the present time, or retrieving, from the outage schedule DB (30), information on statistics of each period and/or information the user wants to browse, whereby the user can see the information.

Now, input of outage schedule by a user will be described.

In a case a user sets up utility (or facilities) to be outaged, the controller (10) sets up a line circuit breaker and a line switch of a region, and the user can input an outage schedule by selecting duration and other necessary information. To this end, the controller (10) is preferred to store utility in the outage schedule DB (30). Alternatively, the controller (10) may be mounted with a separate storage (not shown) for storing the utility.

The controller (10) controls in such a manner that the outage schedule DB (30) can store the outage schedule set up by the user input, whereby topology change (described later) can be executed.

A topology process is a process where information of a line circuit breaker is received from SCADA (Supervisory Control and Data Acquisition) to determine a current bus/branch model. In the topology process, a branch/injection table is generated, a measurement data is received from a RTDB (Real Time Data Base), bus/branch model is configured (physical node is changed to electrical node), a link between utilities is configured (connection relationship between tables is determined/upgraded), and an island is inspected {isolation of system, and separation of constituent elements (generator, transformer, etc) are inspected}.

The topology process in real time EMS can provide data that is needed in all applications. It should be apparent to the skilled in the art that the topology process is well known, such that no more detailed explanation thereto will be given hereunder.

In a case a user inputs an outage schedule through the user input unit (20), the controller (10) according to the exemplary embodiment of the present disclosure applies an imaginary relevant outage schedule to a system. At this time, reconfiguration of a system excluding an outaged portion from the system is defined as "topology change". A system that is applied with the outage can be obtained from the topology change of the controller (10), and validity of a system operation standard can be determined relative to a system having a topology thus changed.

That is, the controller (10) determines the validity of system operation standard relative to the topology-changed system after executing the topology change. At this time, the determination of validity of system operation standard is executed using power flow calculation (described later), fault calculation (described later) and credible accident interpretation (described later).

The power flow (PF) calculation is defined by calculation of voltage size and angle of each bus and node. Power flow (active power, reactive power) of each line, amount of power flow of each administration, and each region can be calculated by the calculation, and result of violation is outputted.

The controller (10) according to the exemplary embodiment of the present disclosure executes the power flow calculation relative to the outage schedule-applied system obtained by the topology change, and in a case high voltage bus, low voltage bus and overload line are present when the outage is applied, the controller (10) may provide information to an operator that a current outage schedule may cause problems to the system.

The fault calculation means to calculate a fault current or a fault voltage affecting neighboring utility when the utility is faulted, and is utilized for accurate calculation of fault capacity and correction of protective relay. A result of fault calculation prevents unpredicted fault on the utility from being propagated second time.

The line circuit breaker calculates breaking (interruption) capacity through the fault calculation. An outage schedule is applied to the breaking capacity of the line circuit breaker set up by the fault calculation of an entire system, whereby a breaking capacity greater than that of usual day can flow when the fault calculation is executed again.

For a non-limiting example, in a case a breaking capacity of 60 kA, which is greater than that of usual day, is applied due to the outage in a line circuit breaker on a system where a breaking capacity of 50 kA is normally set up during usual day, the line circuit breaker executes a breaking function, whereby the system may be caused with problems.

Thus, the controller (10) can determine the problem that may be generated by the outage through the fault calculation, and the determination can be transmitted to the operator.

Meanwhile, the credible accident interpretation is to calculate an influence affecting a power system in a case an imaginary fault is generated relative to a utility forming the power system. The controller (10), through the credible accident interpretation, executes an alarm by determining voltage violation, line/transformer violation, phase difference violation and interface violation, whereby the operator can determine the influence of the outage affecting the system.

As noted from the foregoing, the controller (10) can review problems that may be generated on a re-built system by executing the topology change automatically re-building the system by applying the outage schedule, and executing the validity determination of the system operation standard through the power flow calculation, the fault calculation and the credible accident interpretation, whereby problems that may be generated through the outage can be removed to stably and efficiently operate the system.

The controller (10) executes the validity determination of system operation standard, and allows a user to learn what type of problem has occurred at a certain area relative to an outage schedule determined as not being valid, and allows the display unit (40) to display the problem.

In order to solve the problems caused by the outage schedule, the user can determine, using the aforementioned configuration, problems on the system by direct change through a single line diagram of an entire system provided by the display unit (40). The controller (10) approves an outage schedule determined as being appropriate to the system operation standard, controllably allows the transmitter (50) to transmit the appropriate outage schedule to a power company server (not shown) via network, where the power company server executes the outage schedule based on the transmitted information.

Figure 3:
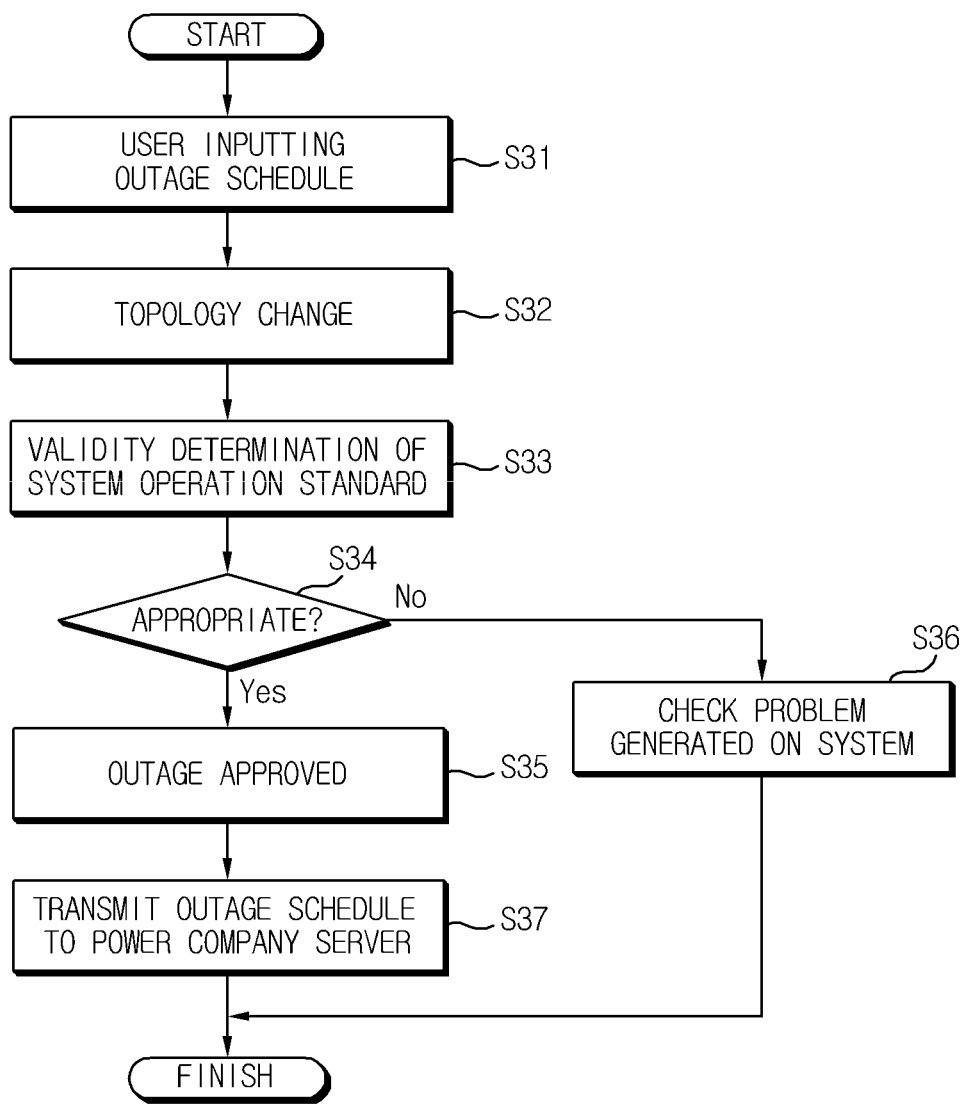
FIG. 3 is a flowchart illustrating an outage schedule management method in EMS according to an exemplary embodiment of the present disclosure.

FIG. 3 is a flowchart illustrating an outage schedule management method in EMS according to an exemplary embodiment of the present disclosure, where the flow is executed by the apparatus of FIG. 2.

Referring to FIG. 3, the outage schedule management method in EMS according to an exemplary embodiment of the present disclosure is started by a user inputting an outage schedule through the user input unit (20) (S31).

In a case the user sets up a utility to be outaged, the controller (10) sets up a line circuit breaker and a line switch of a region, where the user can input the outage schedule by selecting duration and other necessary information. The outage schedule inputted by the user may include, for a non-limiting example, any one of yearly, monthly, next day and emergency outage schedules. However the present disclosure is not limited thereto.

The controller (10) stores the thus inputted outage schedules (not shown) and executes the topology change of the system according to the inputted outage schedules (S32), where the topology change applying a relevant imaginary outage schedule to a system has been already explained above.

Successively, the controller (10) executes the validity determination to the topology changed system (S33), where the validity determination is preferably executed by using, for a non-limiting example, the power flow calculation, the fault calculation and the credible accident interpretation, but the present disclosure is not limited thereto.

If it is determined at S33 that the outage schedule is appropriate to the system operation standard, the controller (10) approves the outage (S35), and controls the transmitter (50) (S37), so that a relevant outage schedule can be transmitted to a power company server (not shown) via network.

If it is determined at S33 that the outage schedule is not appropriate to the system operation standard, the controller (10) determines the outage that has occurred on a system (S38), and controllably allows the display unit (40) to display the problem, so that the user can personally check (not shown).

Albeit not being shown in FIG. 3, in a case the user input the outage schedule, the controller (10) may controllably store the outage schedule in the outage schedule DB (30), may store a changed topology if the topology is changed, and may store a result of the validity of the system operation standard. Results executed at each stage may be stored in the outage schedule DB (30) by control of the controller (10).

Meanwhile, the exemplary embodiments of the present disclosure may be embodied in the form of program code embodied in tangible media, such as magnetic recording media, optical recording media, solid state memory, floppy diskettes, CD-ROMs, hard drives, or any other non-transitory machine-readable storage medium. When the exemplary embodiments of the present disclosure are implemented using software, constituent means of the present disclosure may be code segments executing necessary processes. The programs or code segments may be also embodied in the form of program code, for example, whether stored in a non-transitory machine-readable storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the disclosure.

The above-described embodiments of the present invention can also be embodied as computer readable codes/instructions/programs on a computer readable recording medium. Examples of the computer readable recording medium include storage media, such as magnetic storage media (for example, ROMs, floppy disks, hard disks, magnetic tapes, etc.), optical reading media (for example, CD-ROMs, DVDs, etc.), carrier waves (for example, transmission through the Internet) and the like. The computer readable recording medium can also be distributed over network coupled computer systems so that the computer readable code is stored and executed in a distributed fashion.

The above-mentioned apparatus and method for controlling train speed according to the present disclosure may, however, be embodied in many different forms and should not be construed as limited to the embodiments set forth herein. Thus, it is intended that embodiments of the present disclosure may cover the modifications and variations of this disclosure provided they come within the scope of the appended claims and their equivalents.

While particular features or aspects may have been disclosed with respect to several embodiments, such features or aspects may be selectively combined with one or more other features and/or aspects of other embodiments as may be desired.

What is claimed is:

1. An outage schedule management apparatus, comprising:
a controller performing a topology change for applying a relevant imaginary outage schedule to a system in response to an outage schedule set up by a user input, determining validity of a system operation standard by performing a power flow calculation relative to the changed topology, a fault calculation and a credible accident interpretation and approving the outage schedule based on the determined validity; and
a first storage storing the outage schedule control of the controller,
wherein the controller further determines the validity in response to a result of the credible accident interpretation and by:
calculating a breaking capacity of a line circuit breaker by performing a first fault calculation on the entire system;
performing a second fault calculation by applying the outage schedule to the calculated breaking capacity; and
comparing a result of the first fault calculation with a result of the second fault calculation.

2. The apparatus of claim 1, further comprising:
a display unit displaying the outage schedule under control of the controller and according to approval of the outage schedule.

3. The apparatus of claim 1, further comprising:
a transmitter transmitting the outage schedule via a network if the outage schedule is approved.

4. The apparatus of claim 1, wherein the controller further performs the topology change by applying the outage schedule to the system.

5. The apparatus of claim 4, wherein the controller further performs the topology change by reconfiguring the system to exclude an outaged portion.

6. The apparatus of claim 1, wherein the controller further performs the power flow calculation in order to provide a user with information that an issue may occur in the system if the outage schedule is applied.

7. The apparatus of claim 1, wherein the controller further performs the fault calculation to determine an issue that may occur with regard to the outage schedule and to provide a user with the determination.

8. The apparatus of claim 1, wherein the controller further performs the credible accident interpretation in order to provide a user with influence in the system affected by the outage schedule.

9. The apparatus of claim 1, further comprising a user input unit receiving the user input.

10. The apparatus of claim 9, wherein the controller further designates a line blocker and a line switch of a relevant region to set up the outage schedule when a user sets up facilities for an outage via the user input unit.

11. The apparatus of claim 10, further comprising:
a second storage storing information related to the facilities and the line blocker and the line switch.

12. The apparatus of claim 1, wherein the fault calculation comprises calculating a fault current or a fault voltage affecting an adjacent facility in preparation for a fault of the facility.

13. The apparatus of claim 1, wherein the credible accident interpretation comprises:
calculating an influence on the EMS when an imaginary fault is generated at a facility of the EMS; and
executing an alarm in response to determining a voltage violation and phase difference violation based on the calculation.

14. An outage schedule management method configured for use in an Energy Management System (EMS) including a controller, the method comprising:
performing a topology change for applying a relevant imaginary outage schedule to the EMS in response to an outage schedule set up by a user input of;
determining validity of a system operation standard by performing a power flow calculation relative to the changed topology, a fault calculation and a credible accident interpretation; and
approving the outage schedule based on the determined validity,
wherein the validity is determined in response to a result of the credible accident interpretation and by:
calculating a breaking capacity of a line circuit breaker by performing a first fault calculation on the entire system;
performing a second fault calculation by applying the outage schedule to the calculated breaking capacity; and
comparing a result of the first fault calculation with a result of the second fault calculation.

15. The method of claim 14, further comprising designating a line blocker and a line switch of a relevant region to set up the outage schedule when a user sets up facilities for an outage via the user input.

16. The method of claim 14, wherein performing the topology change comprises applying the outage schedule the EMS.

17. The method of claim 14, wherein the fault calculation comprises calculating a fault current or a fault voltage affecting an adjacent facility in preparation for a fault of the facility.

18. The method of claim 14, wherein the credible accident interpretation comprises:
calculating an influence on the EMS when an imaginary fault is generated at a facility of the EMS; and
executing an alarm in response to determining a voltage violation and phase difference violation based on the calculation.

* * * * *